(12) United States Patent
Byun et al.

(10) Patent No.: US 8,501,346 B2
(45) Date of Patent: Aug. 6, 2013

(54) RECHARGEABLE BATTERY

(75) Inventors: Sang-Won Byun, Yongin-si (KR); Byung-Kyu Ahn, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/975,236

(22) Filed: Dec. 21, 2010

(65) Prior Publication Data

US 2011/0287291 A1 Nov. 24, 2011

(30) Foreign Application Priority Data

May 20, 2010 (KR) ........................ 10-2010-0047714

(51) Int. Cl.
*H01M 2/02* (2006.01)
(52) U.S. Cl.
USPC .......................................................... 429/181
(58) Field of Classification Search
USPC ................. 429/122, 162, 163, 164, 171, 179, 429/94, 177, 181, 187
See application file for complete search history.

(56) References Cited

U.S. PATENT DOCUMENTS

| 6,573,001 | B1 * | 6/2003 | Shinohara et al. ............ 429/185 |
| 7,781,088 | B2 | 8/2010 | Yamauchi et al. |
| 2003/0124420 | A1 | 7/2003 | Fong et al. |
| 2003/0194609 | A1 | 10/2003 | Nam et al. |
| 2006/0051664 | A1 | 3/2006 | Tasai et al. |
| 2009/0186269 | A1 | 7/2009 | Kim et al. |

FOREIGN PATENT DOCUMENTS

| JP | 52-50541 | 4/1977 |
| JP | 58-169667 U | 11/1983 |
| JP | 08-096777 | 4/1996 |
| JP | 2000-138055 | 5/2000 |
| JP | 2003-317678 | 11/2003 |
| JP | 2004-207089 | 7/2004 |
| JP | 2004-253295 | 9/2004 |
| JP | 2008-066254 | 3/2008 |
| JP | 2008-251213 | 10/2008 |
| KR | 10-2009-0081197 | 7/2009 |

OTHER PUBLICATIONS

European Search Report dated May 6, 2011, for corresponding European Patent application 11153545.6.

(Continued)

*Primary Examiner* — Patrick Ryan
*Assistant Examiner* — Alex Usyatinsky
(74) *Attorney, Agent, or Firm* — Christie, Parker & Hale, LLP (57) ABSTRACT

A rechargeable battery having improved supporting force of a lead tab and fastening force between the lead tab and an electrode terminal. A rechargeable battery according to an exemplary embodiment includes an electrode assembly formed by winding positive and negative electrodes formed at both sides of a separator together with the separator, a case housing the electrode assembly therein, a cap plate sealing an opening at one side of the case, an electrode terminal formed in a terminal hole of the cap plate, and a lead tab connecting the electrode terminal and the electrode assembly in the case. The electrode terminal includes an inner terminal plate formed at an inner side of the cap plate and a main coupling protrusion and a first auxiliary coupling protrusion protruding from the inner terminal plate and respectively coupled to a first fastening hole and a second fastening hole of the lead tab.

11 Claims, 6 Drawing Sheets

(56) References Cited

OTHER PUBLICATIONS

KIPO Notice of Allowance dated Mar. 2, 2012, for Korean priority Patent application 10-2010-0047714, 5 pages.
Japanese Notice of Allowance dated Mar. 5, 2013, for corresponding Japanese Patent application 2011-036115, (2 pages).
Patent Abstracts of Japan, and English machine translation of Japanese Publication 08-096777, (8 pages).
Patent Abstracts of Japan, and English machine translation of Japanese Publication 2000-138055, (10 pages).
Patent Abstracts of Japan, and English machine translation of Japanese Publication 2004-207089, (18 pages).
Patent Abstracts of Japan, and English machine translation of Japanese Publication 2004-253295, (22 pages).
Patent Abstracts of Japan, and English machine translation of Japanese Publication 2008-066254, (16 pages).
Patent Abstracts of Japan, and English machine translation of Japanese Publication 2008-251213, (12 pages).
SIPO Office action dated May 22, 2013, with English translation, corresponding to Chinese Patent application 201110069725.2, (13 pages).

* cited by examiner

FIG.6

RECHARGEABLE BATTERY

CROSS-REFERENCE TO RELATED APPLICATIONS

This application claims priority to and the benefit of Korean Patent Application No. 10-2010-0047714, filed in the Korean Intellectual Property Office on May 20, 2010, the entire content of which is incorporated herein by reference.

BACKGROUND

1. Field

The described technology relates generally to a rechargeable battery that improves fastening force of a lead tab and an electrode terminal.

2. Description of the Related Art

A rechargeable battery includes an electrode assembly formed in a jelly roll shape by winding a positive electrode, a negative electrode, and a separator. The rechargeable battery further includes: positive and negative electrodes formed at both sides of the separator, a case housing the electrode assembly, a cap plate sealing an opening of the case, an electrode terminal electrically connected (coupled) to the electrode assembly and protruding to the outside of the cap plate through a terminal hole formed in the cap plate, and a lead tab, respectively connecting (coupling) the positive electrode and the negative electrode of the electrode assembly to the electrode terminal.

The lead tab is coupled (e.g. fastened) to the electrode terminal from an inner side of the cap plate by caulking and welding. The lead tab coupled to the electrode assembly is made of a thinner plate than the electrode terminal so that it has a weak supporting force, and accordingly, the lead tab may droop while being separated from the welded portion by slight vibration. That is, the lead tab may be bent at the welded portion.

When the drooping or bending of the lead tab becomes worse in the welded portion, the lead tab is separated from the electrode terminal at the welded portion so that the lead tab and the electrode terminal are electrically disconnected. Particularly, when the lead tab connected (coupled) to the negative electrode is made of copper, the lead tab is more easily drooped or bent at the welded portion with the electrode terminal so that the lead tab may be easily separated from the electrode terminal.

The above information disclosed in this Background section is only for enhancement of understanding of the background of the described technology and therefore it may contain information that does not form the prior art that is already known in this country to a person of ordinary skill in the art.

SUMMARY

An aspect of an embodiment of the present invention is directed toward a rechargeable battery that can improve the supporting force of a lead tab and the coupling (e.g. fastening) force between the lead tab and an electrode terminal.

According to one or more embodiments of the present invention, a rechargeable battery includes: an electrode assembly including positive and negative electrodes at both sides of a separator, wherein the positive and negative electrodes are wound together with the separator, a case housing the electrode assembly therein, a cap plate sealing an opening at one side of the case, an electrode terminal in a terminal hole of the cap plate, and a lead tab coupling the electrode terminal and the electrode assembly in the case including a connection portion defining a first fastening hole and a second fastening hole. The electrode terminal includes an inner terminal plate formed at an inner side of the cap plate and a main coupling protrusion and a first auxiliary coupling protrusion protruding from the inner terminal plate, and wherein the main coupling protrusion is coupled to the connection portion of the lead tab via the first fastening hole, and the first auxiliary coupling protrusion is coupled to the connection portion of the lead tab via the second fastening hole.

The electrode terminal may further include a second auxiliary protrusion, and the connection portion of the lead tab may further define a third fastening hole.

The main coupling protrusion may be centered between the first auxiliary protrusion and the second auxiliary protrusion.

The second auxiliary coupling protrusion may be coupled to the connection portion of the lead tab via the third fastening hole.

The first auxiliary coupling protrusion may be coupled to the connection portion of the lead tab via the second fastening hole by caulking or tight fitting.

The main coupling protrusion may be formed at a center of the inner terminal plate and the first auxiliary coupling protrusion may be formed between the main coupling protrusion and an end of the cap plate.

The electrode terminal may further include an outer terminal plate provided at an outer side of the cap plate and a screw-thread portion coupled to the outer terminal plate.

The outer terminal plate and the screw-thread portion may be made of the same material and may be welded to each other.

The outer terminal plate and the electrode terminal may be made of different materials and coupled to each other by caulking.

The electrode terminal may further include a screw-thread portion fastened by a nut provided at an outer side of the cap plate.

The electrode terminal may further include at least another auxiliary coupling protrusion, and the lead tab may further define at least another fastening hole.

As described, according to the exemplary embodiment of the present invention, the main coupling protrusion and the first auxiliary coupling protrusion are provided at the inner terminal plate of the electrode terminal and respectively coupled to the first and second fastening holes of the lead tab so that supporting force of the lead tab can be improved and the fastening force between the lead tab and the electrode terminal can also be improved.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 1:
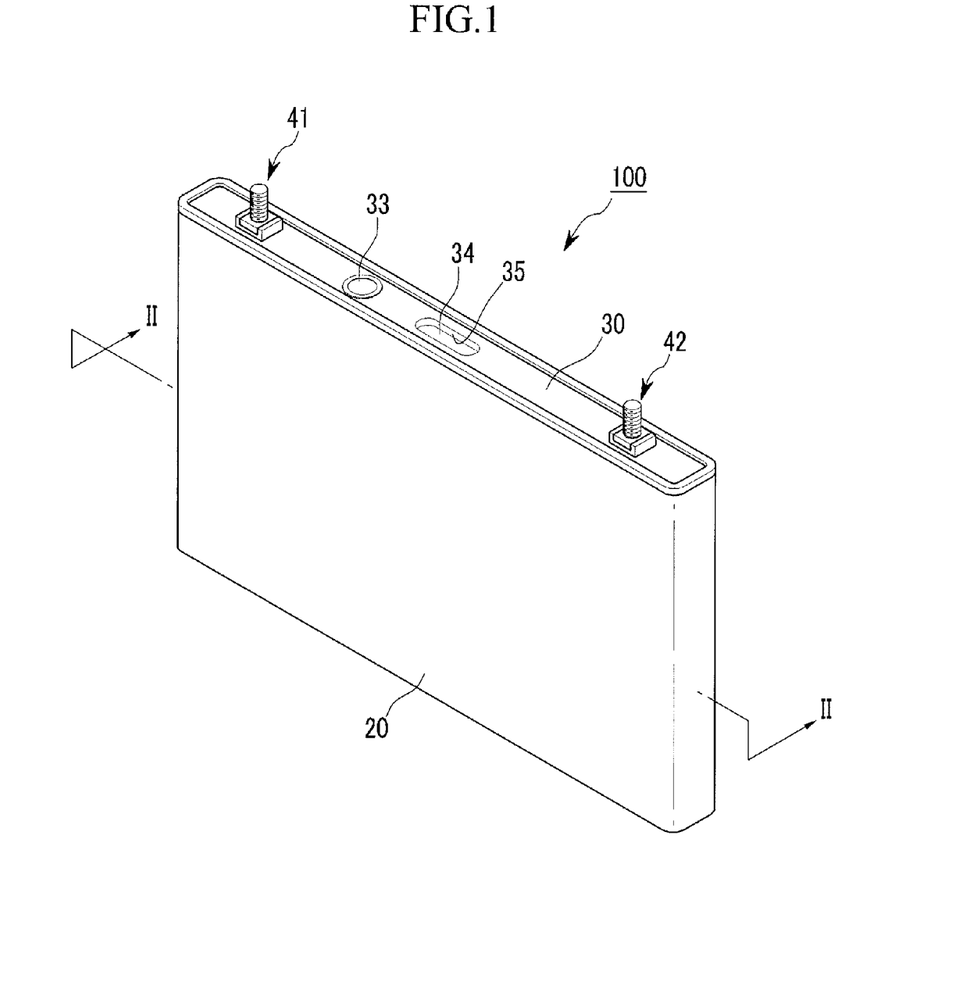
FIG. 1 is a perspective view of a rechargeable battery according to a first exemplary embodiment of the present invention.
Figure 2:
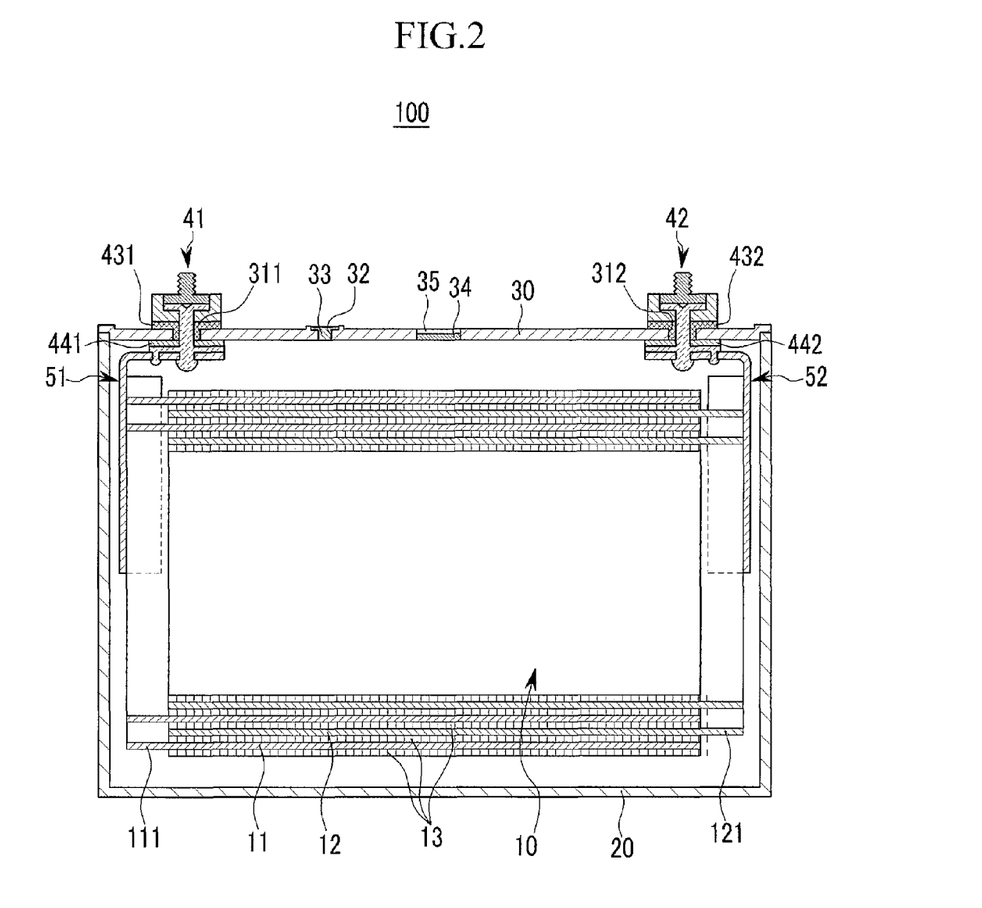
FIG. 2 is a cross-sectional view of FIG. 1, taken along the line

FIG. 1 is a perspective view of a rechargeable battery according to a first exemplary embodiment of the present invention and FIG. 2 is a cross-sectional view of FIG. 1, taken along the line II-II. Referring to FIG. 1 and FIG. 2, a rechargeable battery 100 of the first exemplary embodiment includes a case 20 housing an electrode assembly 10 therein, a cap plate 30 sealing an opening formed at one side of the case 20, electrode terminals 41 and 42 provided in terminal holes 311 and 312 of the cap plate, and lead tabs 51 and 52 connecting the electrodes 41 and 42 to the electrode assembly 10 by welding.

The electrode assembly 10 includes an insulating separator 13, a positive electrode 11, and a negative electrode 12. The positive electrode 11 and the negative electrode 12 are respectively disposed on both sides of the separator 13, and the electrode assembly 10 is formed in a jelly roll shape by winding the positive and negative electrodes 11 and 12 together with the separator 13. The positive electrode 11 and the negative electrode 12 respectively include a current collector formed with a thin metallic foil and an active material coated on the surface of the current collector. The positive electrode 11 and the negative electrode 12 may be partitioned to have a coated region C (refer to FIG. 3) where an active material is coated on a current collector and uncoated regions 111 and 121 where the current collector is not coated with the active material. The coated region C forms most of the positive and negative electrodes 11 and 12, and is arranged at both sides of the coated region C in a jelly roll state.

Figure 3:
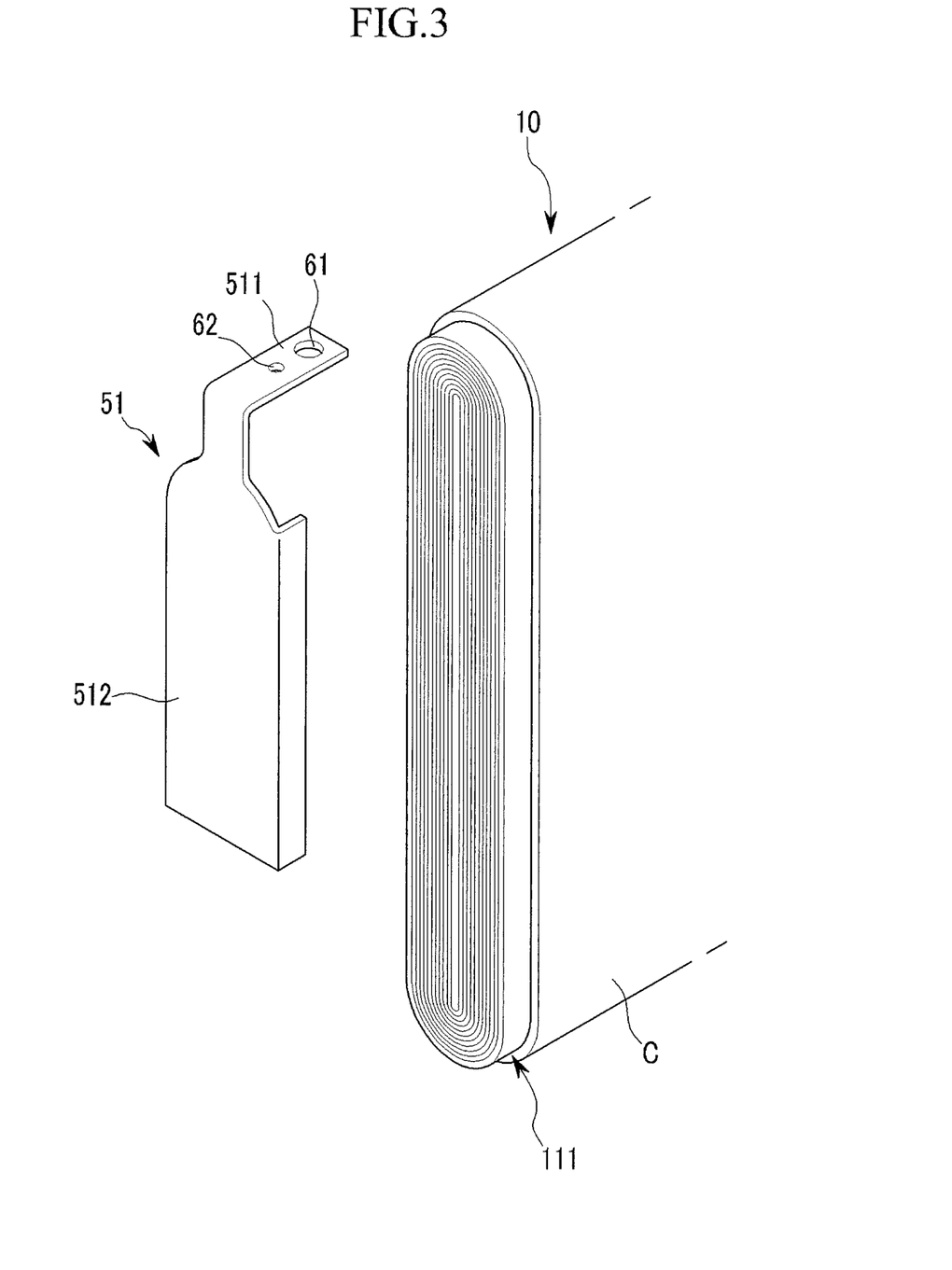
FIG. 3 is an exploded perspective view of an electrode assembly and a lead tab.

The uncoated regions 111 and 121 and the lead tabs 51 and 52 are respectively formed in the positive electrode 11 and the negative electrode 12 with the same structure. FIG. 3 is an exploded perspective view of an electrode assembly and a lead tab with respect to the positive electrode 11. Thus, the uncoated region 111 and the lead tab 51 at the positive electrode 11 will be exemplarily described. The uncoated region 111 is continuously wound such that the end of the uncoated region 111 forms lines that are gradually increased from the same center line. The lead tab 51 includes a connection portion 511 connected (coupled) to the electrode terminal 41 and a current collecting portion 512 formed being bent at one side of the connection portion 511 and welded to the uncoated region 111 by ultrasonic welding and/or laser welding. The connection portion 511 defines a first fastening portion (hole) 61 opened toward the electrode terminal 41 for connection with the electrode terminal 41 and a second fastening portion (hole) 62 disposed parallel with the first fastening portion (hole) 61.

Referring back to FIG. 1 and FIG. 2, a case 20 wholly outlines the rechargeable battery 100, and is formed with a conductive metal such as aluminum, aluminum alloy, or nickel-plated steel. The case 20 provides a space for housing the electrode assembly 10. For example, the case 20 may be formed in a hexahedral shape having an opening at one side to receive the electrode assembly 10. The opening faces upward in the drawing.

The cap plate 30 is formed as a thin plate, and coupled to the opening to the case 20 to seal the opening. The cap plate 30 is formed to block the inside and the outside of the sealed case 20. However, the inside and the output side of the cap plate 30 can be connected (coupled) with each other as necessary. For example, the cap plate 30 includes an electrolyte solution inlet 32 for insertion of electrolyte solution to the inside of the sealed case 20. After insertion of the electrolyte solution, the electrolyte solution inlet 32 is sealed by a sealing cap 33.

The cap plate 30 forms a vent hole 35, and includes a vent plate 34 formed with a thinner plate than the cap plate 30 and welded to the vent hole 35. When the internal pressure of the case 20 is increased to be over a set or predetermined level, the vent plate 34 is ruptured by gas generated from charging and discharging of the electrode assembly 10 to prevent explosion of the rechargeable battery 100.

The electrode terminals 41 and 42 are respectively provided in terminal holes 311 and 312 formed in the cap plate 30 to draw out the positive and negative electrodes 11 and 12 of the electrode assembly 40 to the outside. For example, the electrode terminal 41 and 42 are respectively formed in the terminal holes 311 and 312 by disposing an outer insulators 431 and 432 and inner insulators 441 and 442 thereto such that the electrode terminals 41 and 42 are electrically insulated from the cap plate 30. The terminal holes 311 and 312, the inner insulators 441 and 442, and the outer insulators 431 and 432 are respectively provided in the two electrode terminals 41 and 42 with the same structures, and therefore the electrode terminal 41, the terminal hole 311, the inner insulator 441, and the outer insulator 431 formed at one side will be exemplarily described.

The outer insulator 431 is partially inserted into the terminal hole 311 at the outer side of the cap plate 30 to electrically insulate the electrode terminal 41 and the cap plate 30. That is, the outer insulator 431 insulates the outer surface of the electrode terminal 41 and the outer surface of the cap plate 30, and simultaneously insulates the outer surface of the electrode terminal 41 and the inner surface of the terminal hole 311. The inner insulator 441 electrically insulates the cap plate 30 and the lead tab 51 at the inner side of the cap plate 30 corresponding to the terminal hole 311. That is, the inner insulator 441 insulates the top surface of the lead tab 51 and the inner surface of the cap plate 30 from each other.

Figure 4:
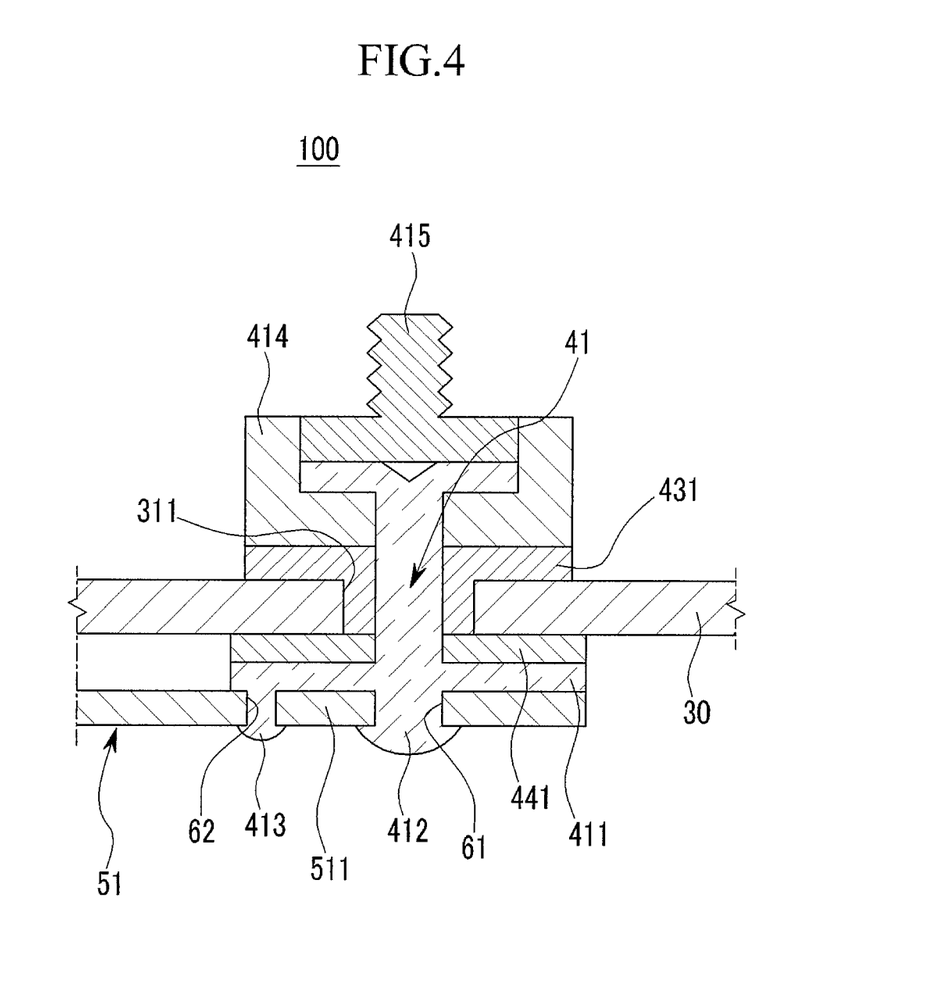
FIG. 4 is a cross-sectional view of a connection portion of an electrode terminal and the lead tab.

FIG. 4 is a cross-sectional view of the electrode terminal and the connection portion of the lead tab. Referring to FIG. 4, the electrode terminal 41 and the lead tab 51 are electrically connected with each other by coupling and welding. A coupling structure of the electrode terminal 41 and the lead tab 51 enhances fastening force of the electrode terminal 41 and the lead tab 51 and increase supporting force of the lead tab 51. For example, the electrode terminal 41 includes an inner terminal plate 411 disposed at the inside of the cap plate 30, a main and a first auxiliary coupling protrusions 412 and 413 coupled to the connection portion 511 of the lead tab 51, an outer terminal plate 414 disposed at the outside of the cap plate 30, and a screw-thread 415.

The inner terminal plate 411 is disposed between the connection portion 511 of the lead tab 51 and the inner insulator 441 at the inner side of the cap plate 30. The inner terminal plate 411, the connection portion 511 of the lead tab 51, and the inner insulator 441 are parallel with the cap plate 30. In this case, the inner terminal plate 411 maintains an electrical insulation state with the cap plate 30 by the inner insulator 441.

The main coupling protrusion 412 extends from the electrode terminal 41 and protrudes to the inside of the case 20 from the inner terminal plate 411 and, thus, is coupled to a first fastening hole 61 of the connection portion 511 of the lead tab 51 to secure the welding state between the inner terminal plate 411 and the connection portion 511. For example, the main coupling protrusion 412 is inserted to the first fastening hole 61 and coupled by caulking to electrically connect the connection portion 511 of the lead tab 51 and the inner terminal plate 411 of the electrode terminal 41. The main coupling protrusion 412 is formed at the center of the inner terminal plate 411 to stably realize electrical connection between the connection portion 511 of the lead tab 51 and the inner terminal plate 411.

A first auxiliary coupling protrusion 413 protrudes in parallel with the main coupling protrusion 412 to the inside of the case 20 from the inner terminal plate 411 at one side of the main coupling protrusion 412, and then is coupled to a second fastening hole 62 of the connection portion 511 of the lead tab 51 to secure the welding state between the inner terminal plate 411 and the connection portion 511. That is, the first auxiliary coupling protrusion 413 coupled to the second fastening hole 62 prevents the left side of the connection portion 511 of the lead tab 51 from drooping (refer to FIG. 4), and thereby supports the welding state between the inner terminal plate 411 and the connection portion 511. Since the left side of the connection portion 511 is connected (coupled) to the electrode assembly 10 through the current collecting portion 512, a pulling down force due to vibration and the like may be more strongly applied to the left side compared to that of the right side. For example, the first auxiliary coupling protrusion 413 is inserted into the second fastening hole 62 and then fastened (coupled) by caulking to electrically connect the connection portion 511 of the lead tab 51 with the inner terminal plate 411 of the electrode terminal 41. The first auxiliary coupling protrusion 413 is formed between the main coupling protrusion 412 and the end of the cap plate 30 to increase supporting force of the connection portion 511 of the lead tab 51. Thus, the connection portion 511 of the lead tab 51 forms a structure on the connection portion 511 that hangs down from the inner terminal plate with the first auxiliary coupling protrusion 413 in addition to the main coupling protrusion 412.

As shown in the drawing, the diameter of the main coupling protrusion 412 is greater than the diameter of the first auxiliary coupling protrusion 413 so that the diameter of the first fastening hole 61 is greater than that of the second fastening hole 62. In the first exemplary embodiment, one auxiliary coupling protrusion 413 is formed in the inner terminal plate 411 and one second fastening hole 62 is formed in the connection portion 511 corresponding to the auxiliary coupling protrusion 413. Alternatively, the auxiliary coupling protrusion and the second fastening hole may be provided in plural and coupled with each other. That is, more than two auxiliary coupling protrusions may be provided and/or more than two fastening holes may be provided. In addition, the auxiliary coupling protrusion 413 may be inserted into the second fastening hole 62 of the connection portion 511 and then fastened by caulking, but it may be coupled by tight fitting or loose fitting.

Figure 5:
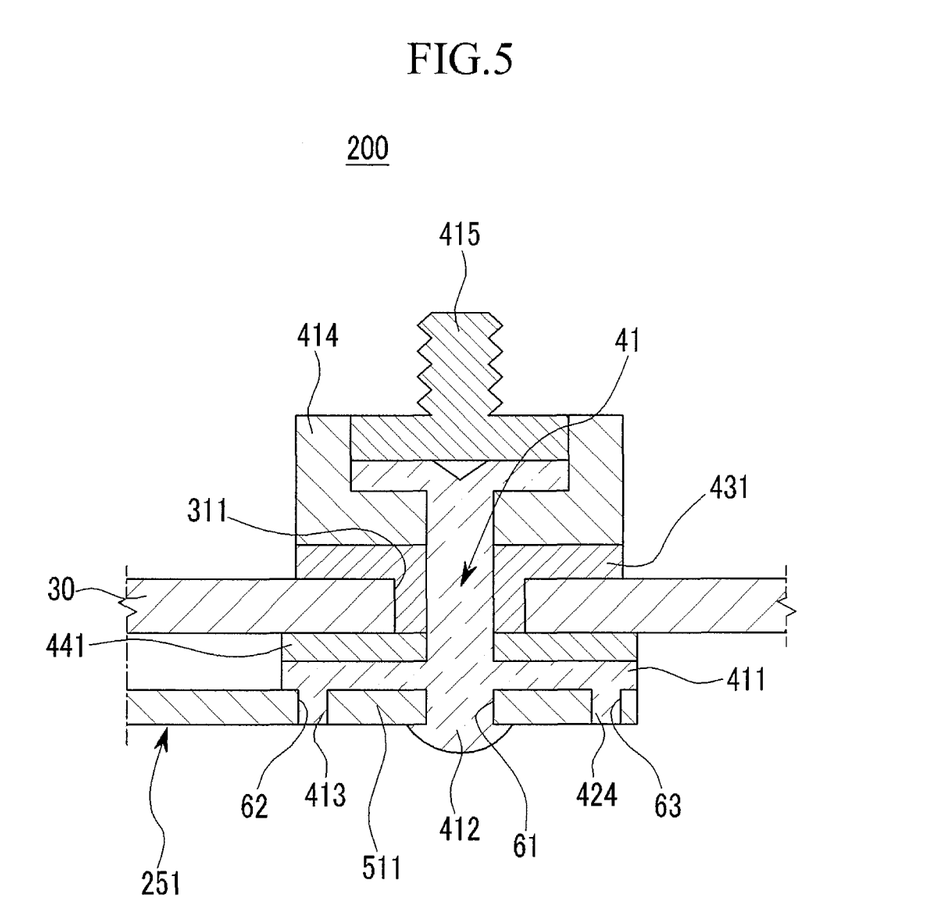
FIG. 5 is a cross-sectional view of a connection portion of an electrode terminal and a lead tab of a rechargeable battery according to a second exemplary embodiment of the present invention.

FIG. 5 is a cross-sectional view of an electrode terminal and a connection portion of a lead tab in a rechargeable battery according to a second exemplary embodiment of the present invention. In the description of the rechargeable battery with reference to FIG. 5, descriptions of components of the rechargeable battery 200 identical or similar to those of the rechargeable battery 100 of the first exemplary embodiment will be omitted, and different components will be described.

In the rechargeable battery 200 according to the second exemplary embodiment, first and second auxiliary coupling protrusion 413 and 424 formed in an inner terminal plate 411 are formed as a pair at both sides with respect to the center of a main coupling protrusion 412. In a connection portion 511 of a lead tab 251, a second fastening hole 62 and a third fastening hole 63, respectively formed at both sides of a first fastening hole 61 are provided as a pair to be respectively coupled to the first auxiliary coupling protrusion 413 and the second auxiliary coupling protrusion 424. The pair of first and second auxiliary coupling protrusions 413 and 424, more tightly couples the connection portion 511 of the lead tab 251 and the inner terminal plate 411 at both sides of the first fastening hole 61.

In FIG. 5, the first and second auxiliary coupling protrusions 413 and 424 are maintained by insertion into the second fastening holes 62 and 63. The main coupling protrusion 412 is inserted into the first fastening hole 61 and fastened by caulking, and the connection portion 511 is welded to the inner terminal plate 411, and therefore, the connection portion 511 of the lead tab 251 can improve supporting force and also drooping can be prevented even though the auxiliary coupling protrusion 413 is inserted in the second fastening hole 62 without being caulked. In this case, the auxiliary coupling protrusion 413 may be coupled to the second fastening hole 62 by tight fitting or loose fitting. Compared to the loose fitted, tight fitting of the auxiliary coupling protrusion 413 can further improve the support force of the connection portion 511 of the lead tab 52. The first and second auxiliary coupling protrusions 413 and 424 may more effectively support the connection portion 511 of the lead tab 251 by being respectively caulked in the second fastening holes 62 and 63.

Referring to FIG. 4 and FIG. 5, the outer terminal plate 414 is provided in the outer side of the cap plate 30 by disposing an outer insulator 431 such that it is electrically connected (coupled) to the electrode terminal 41. For example, the outer terminal plate 414 may be made of a material that is different from that of the electrode terminal 41 and coupled thereto by caulking. In addition, the screw-thread portion 415 may be made of a material that is the same as that of the outer terminal plate 414 and welded thereto. The electrode terminal 41 is coupled to the outer terminal plate 414 by caulking so that the screw-thread portion 415 can be welded to the outer terminal plate 414. In this case, the outer terminal plate 414 and the screw-thread portion 415 are made of a material having stronger mechanical strength than the electrode terminal 41 such that the screw-thread portion 415 has strong torque durability when a bus bar is connected (coupled) to the screw-thread portion 415 and a nut is fastened thereto.

Figure 6:
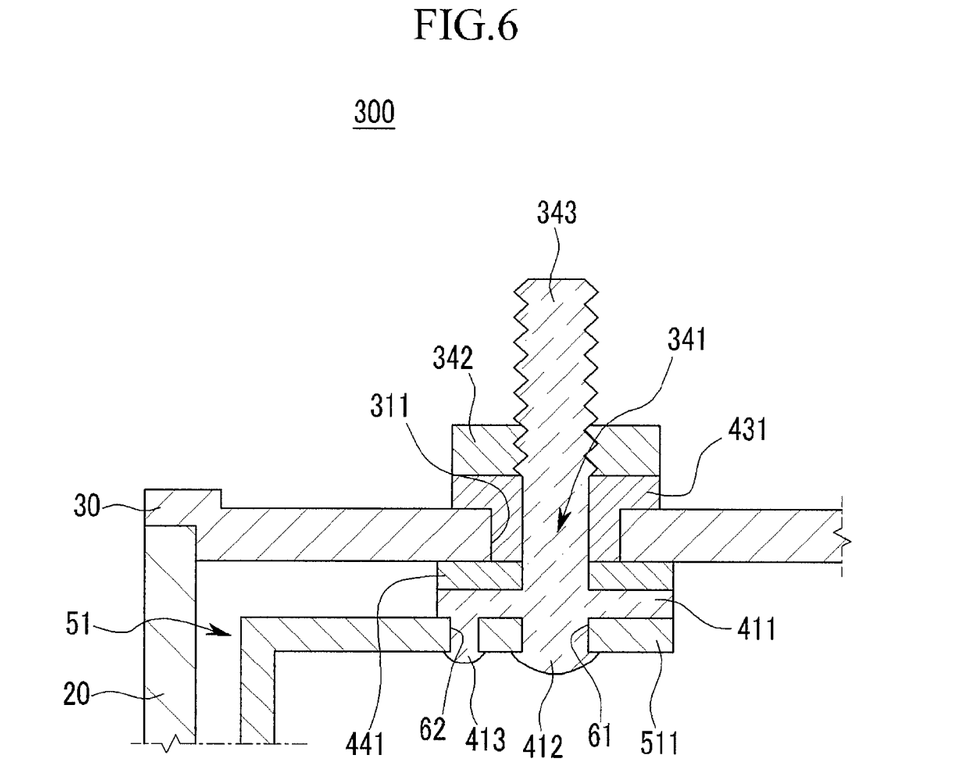
FIG. 6 is a cross-sectional view of a connection portion of an electrode terminal and a lead tab of a rechargeable battery according to a third exemplary embodiment of the present invention.

FIG. 6 is a cross-sectional view of an electrode terminal and a connection portion of a lead tab of a rechargeable battery according to a third exemplary embodiment of the present invention. Referring to FIG. 6, an electrode terminal 341 of a rechargeable battery 300 according to the third exemplary embodiment includes a screw-thread portion 343 formed at the outer side of a cap plate 30 and fastened by a nut 342. In the third exemplary embodiment, the electrode terminal 341, an inner terminal plate 411, and the screw-thread portion 343 are made of the same material. Thus, a main coupling protrusion 412 and a first auxiliary coupling protrusion 413 and a connection unit 511 and a lead tab 51 having first and second fastening holes 61 and 62, respectively that correspond to the main coupling protrusion 412 and the first auxiliary coupling protrusion 413, are not limited to the first and second exemplary embodiments. That is, they may be applied to the case that the electrode terminal 341 and the screw-thread portion 343 are made of the same material (or substantially the same material) as in the third exemplary embodiment.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

| Description of symbols | |
| --- | --- |
| 100, 200, 300: rechargeable battery | 10: electrode assembly |
| 11: positive electrode | 12: negative electrode |
| 13: separator | 20: case |
| 30: cap plate | 32: electrolyte solution inlet |
| 33: sealing cap | 34: vent plate |
| 35: vent hole | 41, 42, 341: electrode terminal |
| 51, 52, 251: lead tab | 61: first fastening hole |
| 62, 63: second, third fastening hole | 111, 121: uncoated region |
| 311, 312: terminal hole | 342: nut |
| 412: main coupling protrusion | |
| 413, 424: first, second auxiliary coupling protrusion | |
| 414: outer terminal plate | 415, 343: screw thread |
| 431, 432: outer insulator | 441, 442: inner insulator |
| 511: connection portion | C: coated region |

What is claimed is:

1. A rechargeable battery comprising: an electrode assembly comprising:
    an electrode assembly positive and negative electrodes at both sides of a separator, wherein the positive and negative electrodes are wound together with the separator;
    a case housing the electrode assembly therein;
    a cap plate sealing an opening at one side of the case;
    an electrode terminal in a terminal hole of the cap plate; and
    a lead tab coupling the electrode terminal and the electrode assembly in the case comprising a connection portion defining a first fastening hole and a second fastening hole,
    wherein the electrode terminal comprises:
    an inner terminal plate formed at an inner side of the cap plate, and
    a main coupling protrusion and a first auxiliary coupling protrusion protruding from the inner terminal plate, and
    wherein the main coupling protrusion is coupled to the connection portion of the lead tab via the first fastening hole, and the first auxiliary coupling protrusion is coupled to the connection portion of the lead tab via the second fastening hole, and wherein the main coupling protrusion, the first auxiliary coupling protrusion, and the inner terminal plate are electrically connected, wherein the inner terminal plate is integrally formed with the main coupling protrusion and the first auxiliary coupling protrusion.

2. The rechargeable battery of claim 1, wherein the electrode terminal further comprises a second auxiliary coupling protrusion, and the connection portion of the lead tab further defines a third fastening hole.

3. The rechargeable battery of claim 2, wherein the main coupling protrusion is centered between the first auxiliary coupling protrusion and the second auxiliary coupling protrusion.

4. The rechargeable battery of claim 2, wherein the second auxiliary coupling protrusion is coupled to the connection portion of the lead tab via the third fastening hole.

5. The rechargeable battery of claim 1, wherein the first auxiliary coupling protrusion is coupled to the connection portion of the lead tab via the second fastening hole by caulking or tight fitting.

6. The rechargeable battery of claim 1, wherein the main coupling protrusion is formed at a center of the inner terminal plate and the first auxiliary coupling protrusion is formed between the main coupling protrusion and an end of the cap plate.

7. The rechargeable battery of claim 1, wherein the electrode terminal further comprises an outer terminal plate provided at an outer side of the cap plate and a screw-thread portion coupled to the outer terminal plate.

8. The rechargeable battery of claim 7, wherein the outer terminal plate and the screw-thread portion are made of the same material and are welded to each other.

9. The rechargeable battery of claim 8, wherein the outer terminal plate and the electrode terminal are made of different materials and are coupled to each other by caulking.

10. The rechargeable battery of claim 1, wherein the electrode terminal further comprises a screw-thread portion fastened by a nut provided at an outer side of the cap plate.

11. The rechargeable battery of claim 1, wherein the electrode terminal further comprises at least another auxiliary coupling protrusion, and the lead tab further defines at least another fastening hole.

* * * * *

UNITED STATES PATENT AND TRADEMARK OFFICE
CERTIFICATE OF CORRECTION

| | | |
|---|---|---|
| PATENT NO. | : 8,501,346 B2 | Page 1 of 1 |
| APPLICATION NO. | : 12/975236 | |
| DATED | : August 6, 2013 | |
| INVENTOR(S) | : Sang-Won Byun et al. | |

It is certified that error appears in the above-identified patent and that said Letters Patent is hereby corrected as shown below:

In the Claims

Column 7, Claim 1, lines 39-40    Delete "comprising: an electrode assembly"
                                  Insert -- comprising --

Signed and Sealed this
Third Day of February, 2015

Michelle K. Lee
*Deputy Director of the United States Patent and Trademark Office*